(12) United States Patent
Yao

(10) Patent No.: US 11,830,395 B2
(45) Date of Patent: Nov. 28, 2023

(54) DETECTION CIRCUIT, METHOD FOR DRIVING THE SAME, AND DISPLAY DEVICE

(71) Applicant: Shanghai Tianma Micro-Electronics Co., Ltd., Shanghai (CN)

(72) Inventor: Qijun Yao, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 17/832,512

(22) Filed: Jun. 3, 2022

(65) Prior Publication Data
US 2022/0309971 A1 Sep. 29, 2022

(30) Foreign Application Priority Data

Mar. 31, 2022 (CN) .......................... 202210342227.9

(51) Int. Cl.
*G09G 3/00* (2006.01)

(52) U.S. Cl.
CPC ..... *G09G 3/006* (2013.01); *G09G 2310/0286* (2013.01); *G09G 2310/0294* (2013.01); *G09G 2310/0297* (2013.01); *G09G 2330/12* (2013.01)

(58) Field of Classification Search
CPC .......... G09G 3/006; G09G 2310/0286; G09G 2310/0294; G09G 2310/0297; G09G 2330/12; G09G 2300/08; G09G 3/20; G09G 2354/00; G09G 2358/00; G06F 21/32

See application file for complete search history.

(56) References Cited

U.S. PATENT DOCUMENTS

| | | | | |
|---|---|---|---|---|
| 6,563,484 B1 * | 5/2003 | Song | ...................... | G09G 5/008 |
| | | | | 348/E5.017 |
| 11,017,196 B1 * | 5/2021 | Wadhwa | ............ | G06V 40/1306 |
| 11,521,416 B2 * | 12/2022 | Liu | ..................... | G06V 40/1306 |
| 2010/0177028 A1 * | 7/2010 | Hsu | ....................... | G09G 3/3688 |
| | | | | 345/100 |
| 2017/0213510 A1 * | 7/2017 | Takenaka | .............. | H02M 3/156 |
| 2019/0279566 A1 * | 9/2019 | Wang | ................. | G06V 40/1376 |
| 2020/0193118 A1 * | 6/2020 | Ding | .................. | G06V 40/1306 |
| 2020/0356743 A1 * | 11/2020 | Li | ...................... | G06V 40/1306 |
| 2020/0410199 A1 * | 12/2020 | Lian | ...................... | G06V 10/98 |
| 2021/0158003 A1 * | 5/2021 | Chakkirala | ......... | G06V 40/1306 |
| 2021/0165988 A1 * | 6/2021 | Choi | ................... | G06V 40/1306 |
| 2021/0264126 A1 * | 8/2021 | Yang | ..................... | G06F 3/0445 |
| 2021/0264846 A1 * | 8/2021 | Liu | ...................... | G09G 3/3291 |
| 2021/0334502 A1 * | 10/2021 | Lee | ....................... | H10K 59/12 |
| 2021/0365655 A1 * | 11/2021 | Ding | ................... | G06V 40/1359 |
| 2022/0004729 A1 * | 1/2022 | Wang | ..................... | G09G 3/00 |
| 2022/0052101 A1 * | 2/2022 | Yao | ..................... | G06V 40/1318 |
| 2022/0147729 A1 * | 5/2022 | Cui | ..................... | G06V 40/1306 |
| 2022/0319221 A1 * | 10/2022 | Liu | ..................... | G06F 3/04166 |

* cited by examiner

*Primary Examiner* — Jose R Soto Lopez
(74) *Attorney, Agent, or Firm* — CHRISTENSEN O'CONNOR JOHNSON KINDNESS PLLC

(57) ABSTRACT

A detection circuit, a method for driving the same, and a display device are provided. In an embodiment, the detection circuit includes driving circuits, signal reading lines, and a pre-configuration module. In an embodiment, one of the signal reading lines is coupled to at least two of the driving circuits. In an embodiment, the pre-configuration module is coupled to the signal reading lines, and configured to output a preset signal to the signal reading lines to pre-configure potentials on the signal reading lines.

22 Claims, 12 Drawing Sheets

During a pre-configuration stage, controlling a pre-configuration module to be turned on to output a preset signal to signal reading lines

↓

During a detection stage, controlling at least one of driving circuits to be turned on to output a detection signal to the signal reading lines

DETECTION CIRCUIT, METHOD FOR DRIVING THE SAME, AND DISPLAY DEVICE

CROSS-REFERENCE TO RELATED APPLICATIONS

The present application claims priority to Chinese Patent Application No. 202210342227.9, filed on Mar. 31, 2022, the content of which is incorporated herein by reference in its entirety.

TECHNICAL FIELD

The present disclosure relates to the field of display technology, and in particular, to a detection circuit and a method for driving the same, and a display device.

BACKGROUND

With the development of science and technology, a variety of display devices with a fingerprint recognition function have appeared on the market, such as mobile phones, tablet computers and smart wearable devices. The fingerprint identification technologies in the related art are classified into capacitive fingerprint identification, optical fingerprint identification, and ultrasonic fingerprint identification. The ultrasonic fingerprint recognition uses reflection of ultrasonic waves to obtain fingerprint images. In this case, the screen does not need to be lit up when using the device, there is no influence under strong light, and the security is relatively high. Compared with the optical fingerprint recognition, the ultrasonic fingerprint recognition has advantages. In the related art, there is a problem that the noise introduced during detection greatly affects the detection accuracy in the application of ultrasonic fingerprint recognition.

SUMMARY

In a first aspect, some embodiments of the present disclosure provide a detection circuit. The detection circuit includes: driving circuits; signal reading lines, one of which is coupled to at least two of the driving circuits, and a pre-configuration module. The pre-configuration module is coupled to the signal reading lines, and configured to output a preset signal to the signal reading lines to pre-configure potentials on the signal reading lines.

In a second aspect, some embodiments of the present disclosure provide a method for driving a detection circuit. The detection circuit includes: driving circuits; signal reading lines, one of which is coupled to at least two of the driving circuits; and a pre-configuration module coupled to the signal reading lines. The method includes: controlling a working cycle of the detection circuit to include a pre-configuration stage and a detection stage. The pre-configuration module is controlled to be turned on to output a preset signal to the signal reading lines during the pre-configuration stage, and at least one of the driving circuits is controlled to be turned on to output a detection signal to the signal reading lines during the detection stage.

In a third aspect, some embodiments of the present disclosure provide a display device including a detection circuit. The detection circuit includes: driving circuits; signal reading lines, one of which is coupled to at least two of the driving circuits, and a pre-configuration module coupled to the signal reading lines. The pre-configuration module is configured to output a preset signal to the signal reading lines to pre-configure potentials on the signal reading lines.

BRIEF DESCRIPTION OF DRAWINGS

In order to better illustrate technical solutions in embodiments of the present disclosure or in the related art, the accompanying drawings used in the embodiments and in the related art are briefly introduced as follows. It should be noted that the drawings described as follows are merely part of the embodiments of the present disclosure, and other drawings can also be acquired by those skilled in the art.

DESCRIPTION OF EMBODIMENTS

In order to understand the purpose, technical solutions, and advantages of the embodiments of the present disclosure, the technical solutions in the embodiments of the present disclosure are described in the following with reference to the accompanying drawings. It should be understood that the described embodiments are merely exemplary embodiments of the present disclosure, which will not limit the present disclosure. All other embodiments obtained by those skilled in the art according to the embodiments of the present disclosure fall within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

Figure 1:
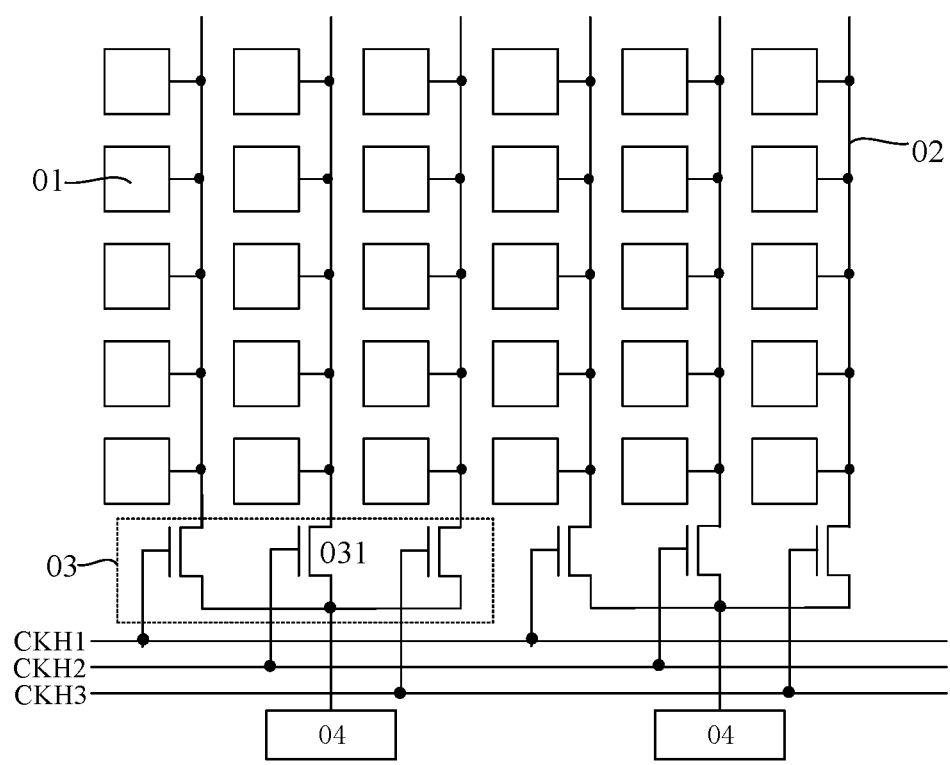
FIG. 1 is a schematic diagram of a detection circuit in the related art.

FIG. 1 is a schematic diagram of a detection circuit in the related art. As shown in FIG. 1, the detection circuit includes multiple driving circuits 01 and multiple signal reading lines 02. For example, the multiple driving circuits 01 are arranged in an array. One signal reading line 02 is coupled to the driving circuits 01 located in one column. Three signal reading lines 02 are coupled to a same demultiplexing circuit 03, and are coupled to a data processing circuit 04 through the demultiplexing circuit 03. A demultiplexing circuit 03 includes three demultiplexing switches 031 corresponding to the signal reading lines 02 in one-to-one correspondence. The detection circuit further includes branch control lines CHK1, CKH2, and CKH3. The signal reading line 02 is configured to read a detection signal output from each of the driving circuit 01 that are located in one column. The demultiplexing switches 031 in a same demultiplexing circuit 03 are switched on in sequence, so that the detection signals read by the signal reading lines 02 are sequentially output to the data processing circuit 04 for processing. In the related art, an action of switching on the demultiplexing switch 031 causes a change of a voltage on the signal reading line 02, and introduces noise to a signal detected by the driving circuit 01. Then, the noise affects detection accuracy. The larger the change of the voltage on the signal reading line 02 is, the greater the noise is.

In order to solve the problems occurring in the related art, some embodiments of the present disclosure provide a detection circuit including a pre-configuration module. The pre-configuration module is configured to pre-configure a voltage on a signal reading line, so as to reduce noise in the detection circuit, thereby improving detection accuracy.

Figure 2:
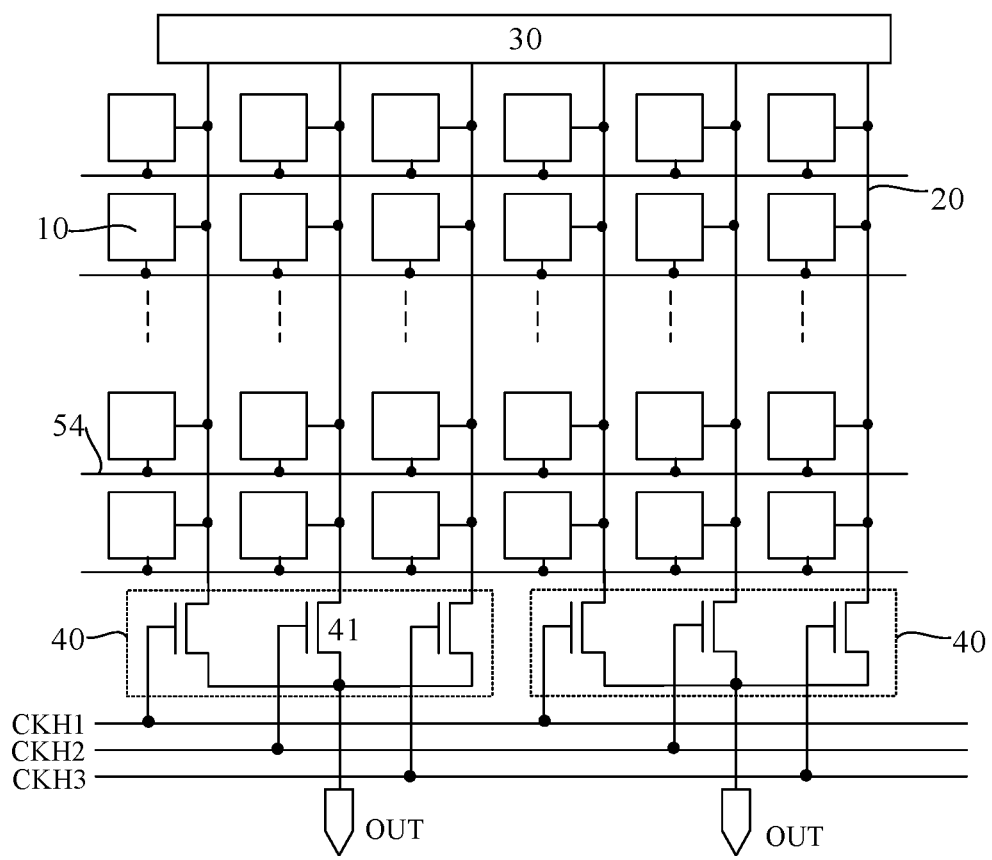
FIG. 2 is a schematic diagram of a portion of a detection circuit according to some embodiments of the present disclosure.

FIG. 2 is a schematic diagram of a portion of a detection circuit according to some embodiments of the present disclosure. As shown in FIG. 2, the detection circuit includes multiple driving circuits 10 and multiple signal reading lines 20. One signal reading line 20 is coupled to at least two driving circuits 10. The detection circuit further includes a pre-configuration module 30. The pre-configuration module 30 is coupled to the signal reading line 20. The pre-configuration module 30 is configured to output a preset signal to the signal reading line 20, to pre-configure a potential on the signal reading line 20.

As shown in FIG. 2, the detection circuit can include a multiplexing circuit 40, and three signal reading lines 20 are connected to a same multiplexing circuit 40. One multiplexing circuit 40 includes three detection switches 41, and the detection switch 41 include a first terminal coupled to the signal reading line 20, a second terminal coupled to an output terminal OUT of the multiplexing circuit 40, and a control terminal coupled to a branch control line. FIG. 2 illustrates that the branch control lines include a first branch control line CKH1, a second branch control line CKH2, and a third branch control line CKH3. In some embodiments, the detection switch 41 includes a thin film transistor, which is either an n-type transistor or a p-type transistor.

The output terminal OUT of the multiplexing circuit 40 is coupled to a data processing circuit. For one multiplexing circuit 40, the three detection switches 41 are switched on in sequence through the first branch control line CKH1, the second branch control line CKH2, and the third branch control line CKH3 in a time division manner, and the signals read by the three signal reading lines 20 are sequentially output to the data processing circuit for processing respectively.

The multiplexing circuit 40 shown in FIG. 2 is merely schematic. In some embodiments of the present disclosure, one multiplexing circuit 40 is coupled to at least two signal reading lines 20. The number of the detection switches 41 in one multiplexing circuit 40 is equal to the number of the signal reading lines 20 coupled to the detection switches 41. In other words, one signal reading line 20 corresponds to one detection switch 41. With the configuration of the multiplexing circuit 40, at least two signal reading lines 20 can share one data processing circuit, thereby reducing the number of the data processing circuits. In some applications, a display module includes the detection circuit according to the embodiments of the present disclosure. The data processing circuit can be integrated in a detection chip, and the signal reading line 20 is coupled to the detection chip through a pad. In this way, the number of pins provided on the detection chip can also be reduced due to the configuration of the multiplexing circuit 40.

In the embodiments of the present disclosure, the signal reading line 20 is coupled to the pre-configuration module 30, so that the pre-configuration module 30 can output a preset signal to the signal reading line 20 before the signal reading line 20 reads an effective detection signal, so as to use the preset signal to pre-configure the potential on the signal reading line 20. After the potential on the signal reading line 20 is pre-configured, an effect of switching on the detection switch 41 that is coupled to the signal reading line 20, on the potential on the signal reading line 20, is reduced, and the noise introduced to the detection signal is reduced, thereby improving the detection accuracy.

Figures 3, 4:
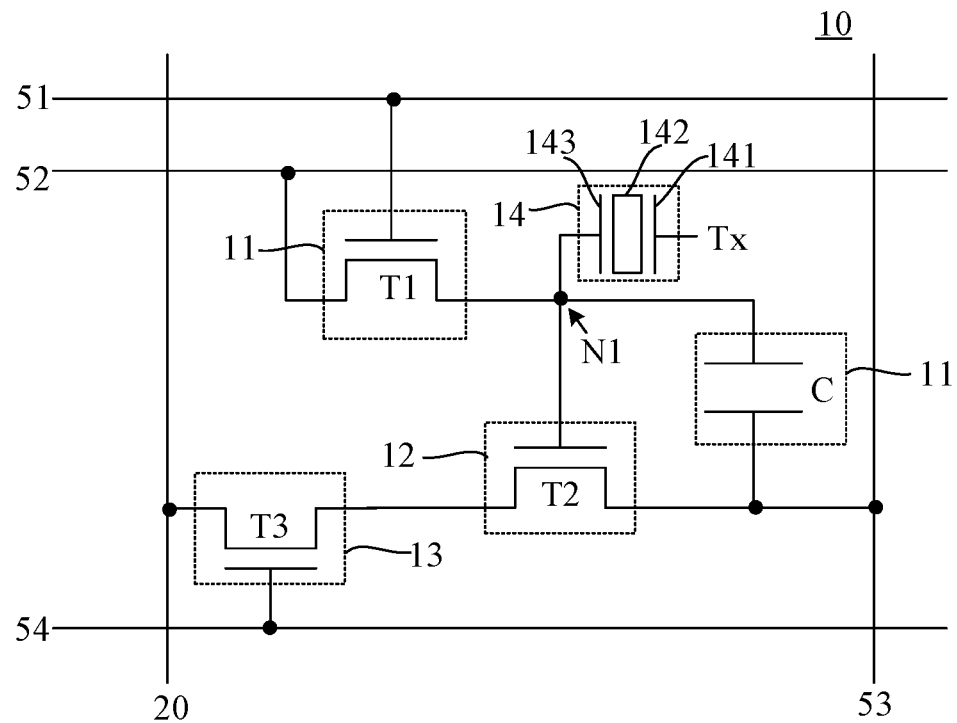
FIG. 3 is a schematic diagram of a method for driving a detection circuit according to some embodiments of the present disclosure.
FIG. 4 is a schematic diagram of a driving circuit in another detection circuit according to some embodiments of the present disclosure.

Some embodiments of the present disclosure provide a method for driving the detection circuit, which is configured to drive the detection circuit according to the embodiments of the present disclosure. FIG. 3 is a flowchart of a method for driving a detection circuit according to some embodiments of the present disclosure. As shown in FIG. 3, the method includes: controlling a working cycle of the detection circuit to include a pre-configuration stage and a detection stage that is performed after the pre-configuration stage.

During the pre-configuration stage, the pre-configuration module 30 is controlled to be switched on to output the preset signal to the signal reading line 20; that is, during this stage, the potential on the signal reading line 20 is pre-configured by using the preset signal.

During the detection stage, at least one driving circuit 10 is controlled to be switched on to output the detection signal to the signal reading line 20. During this stage, the detection circuit performs its detection function.

According to the method provided by the embodiments of the present disclosure, the pre-configuration stage is prior to the detection stage, and the potential on the signal reading line 20 is pre-configured during the pre-configuration stage. In this way, the effect of switching on the detection switch 41 that is coupled to the signal reading line 20, on the potential on the signal reading line 20, is reduced, thereby reducing the noise introduced to the detection signal and thus improving the detection accuracy.

FIG. 4 is a schematic diagram of a driving circuit in another detection circuit according to some embodiments of the present disclosure. In some embodiments, as shown in FIG. 4, the driving circuit 10 includes a reset sampling module 11, a driving module 12, a controlling module 13, and a detection unit 14. The reset sampling module 11 is coupled to the detection unit 14. The reset sampling module 11 is configured to reset the detection unit 14. The reset sampling module 11 is also configured to receive and store an electric signal fed back by the detection unit 14. The driving module 12 is coupled to the reset sampling module 11. The driving module 12 is configured to read and amplify the electric signal stored by the reset sampling module 11. The controlling module 13 is coupled to both the driving module 12 and the signal reading line 20. The controlling module 13 is configured to supply the electric signal amplified by the driving module 12 to the signal reading line 20. As can be seen from FIG. 3, the reset sampling module 11, the detection unit 14, and the driving module 12 are all coupled to a first node N1. In the embodiments of the present disclosure, after the detection unit 14 is reset, the detection unit 14 receives and stores the electric signal fed back by the detection unit 14, thereby ensuring the accuracy of the acquired electric signal. At the same time, the stored electric signal is amplified by the driving module 12, thereby being beneficial to subsequent identification and operation of the electric signals having different values.

As shown in FIG. 4, the reset sampling module 11 includes a first transistor T1 and a storage capacitor C, the driving module 12 includes a second transistor T2, and the controlling module 13 includes a third transistor T3.

A control terminal of the first transistor T1 is coupled to a first control signal line 51, a first electrode of the first transistor T1 is coupled to a first voltage signal line 52, and a second electrode of the first transistor T1 is coupled to the detection unit 14. A first electrode plate of the storage capacitor C is coupled to the detection unit 14, and a second electrode plate of the storage capacitor C is coupled to a second voltage signal line 53. The second voltage signal line 53 is configured to provide a constant voltage signal. A control terminal of the second transistor T2 is coupled to the first electrode plate of the storage capacitor C, a first electrode of the second transistor T2 is coupled to the second electrode plate of the storage capacitor C, and a second electrode of the second transistor T2 is coupled to a first electrode of the third transistor T3. A control terminal of the third transistor T3 is coupled to a read scanning line 54, and a second electrode of the third transistor T3 is coupled to the signal reading line 20.

Figure 5:
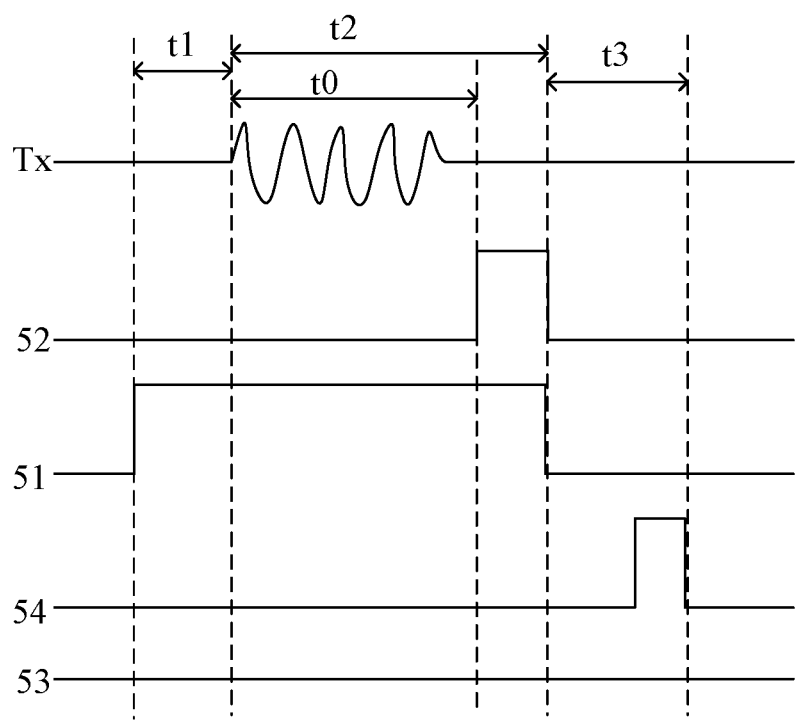
FIG. 5 is a time-sequence diagram of the detection circuit shown in FIG. 4 according to an embodiment of the present disclosure.

The detection circuit according to the embodiments of the present disclosure can be applied to ultrasonic fingerprint identification detection. FIG. 5 is a time-sequence diagram of the detection circuit shown in FIG. 4. As shown in FIG. 5, a working process of the detection circuit includes a reset stage t1, a sampling stage t2, and a reading stage t3.

During the reset stage t1, the first control signal line 51 provides an enable signal to control the first transistor T1, so as to write the signal provided by the first voltage signal line 52 to the first node N1 to reset the detection unit 14.

During the sampling stage t2, a driving voltage Tx is applied to the driving electrode of the detection unit 14 to control the detection unit 14, in such a manner that the detection unit 14 generates an ultrasonic wave signal. At this time, the detection unit 14 serves as an ultrasonic transmitting sensor. During this stage, the first control signal line 51 continuously provides an enable signal to control the first transistor T1 to be turned on, and after a period of t0 from a moment when the detection unit 14 starts to transmit an ultrasonic wave, the detection unit 14 serves as an ultrasonic receiving sensor and converts the received ultrasonic wave into an electric signal, and then stores the electric signal in the storage capacitor C. When the detection unit 14 stores the electric signal in the storage capacitor C, the first voltage signal line 52 provides a bias voltage to raise the electric signal fed back by the detection unit 14, and the raised electric signal is stored in the storage capacitor C. In this way, a detection signal having a large contrast can be obtained, thereby completing the sampling process.

During the reading stage t3, the electric signal stored in the storage capacitor C causes the second transistor T2 to be turned on, and different electric signals stored in the storage capacitor C cause different currents when the second transistor T2 is turned on. The second transistor T2 can amplify the electric signal stored in the storage capacitor C. When the read scanning line 54 provides an enable signal, the third transistor T3 is controlled to be turned on, and the signal reading line 20 reads the amplified electric signal. Then, the signal read by the signal reading line 20 is used to achieve fingerprint recognition detection.

It is understood with reference to a structure of the detection circuit shown in FIG. 2 and a structure of the driving circuit 10 shown in FIG. 4. FIG. 2 illustrates a read scanning line 54, and one read scanning line 54 is coupled to multiple driving circuits 10. When one read scanning line 54 provides an enable signal to control the third transistor T3 in the driving circuit 10 connected to the read scanning line 54 to be turned on, the three detection switches 41 in the multiplexing circuit 40 are turned on sequentially to control the signals read by the three signal reading lines 10 to be sequentially output to the output terminal OUT of the multiplexing circuit 40. When the detection switch 41 is switched on, the voltage on the signal reading line 10 changes to cause the storage capacitor C in the driving circuit 10 to be charged and discharged. In this process, noise is introduced to the signal detected by the driving circuit 10. In the embodiments of the present disclosure, with the configuration of the pre-configuration module 30, the signal reading line 10 is charged to a certain potential by the pre-configuration module 30 before the detection switch 41 in the multiplexing circuit 40 is switched on. In this way, the effect of switching on the detection switch 41 that is coupled to the signal reading line 20, on the potential on the signal reading line 20, is reduced, thereby reducing the noise introduced to the detection signal and thus improving the detection accuracy.

In some embodiments, the detection unit 14 includes a driving electrode 141, a piezoelectric material layer 142, and a receiving electrode 143 that are stacked together. The piezoelectric material layer 142 is arranged between the driving electrode 141 and the receiving electrode 143, and the receiving electrode 143 is coupled to the reset sampling module 11. In the applications of fingerprint identification, when the driving voltage Tx is applied to the driving electrode 141, the piezoelectric material layer 142 senses voltage excitation to generate an inverse piezoelectric effect, so as to output an ultrasonic wave signal. When the ultrasonic wave signal reaches the finger, the ultrasonic wave signal is reflected by the finger. An intensity of the ultrasonic wave reflected back to the piezoelectric material layer 142 varies due to valleys and ridges of the fingerprint. Then, a constant voltage is applied to the driving electrode 141, and the piezoelectric material layer 142 can convert the ultrasonic wave signal into a voltage signal. The voltage signal is stored in the storage capacitor C through the receiving electrode 143, thereby achieving sampling and storage of the detection signal. Then, positions of valleys and ridges of the fingerprint can be determined by the voltage signal.

Figure 6:
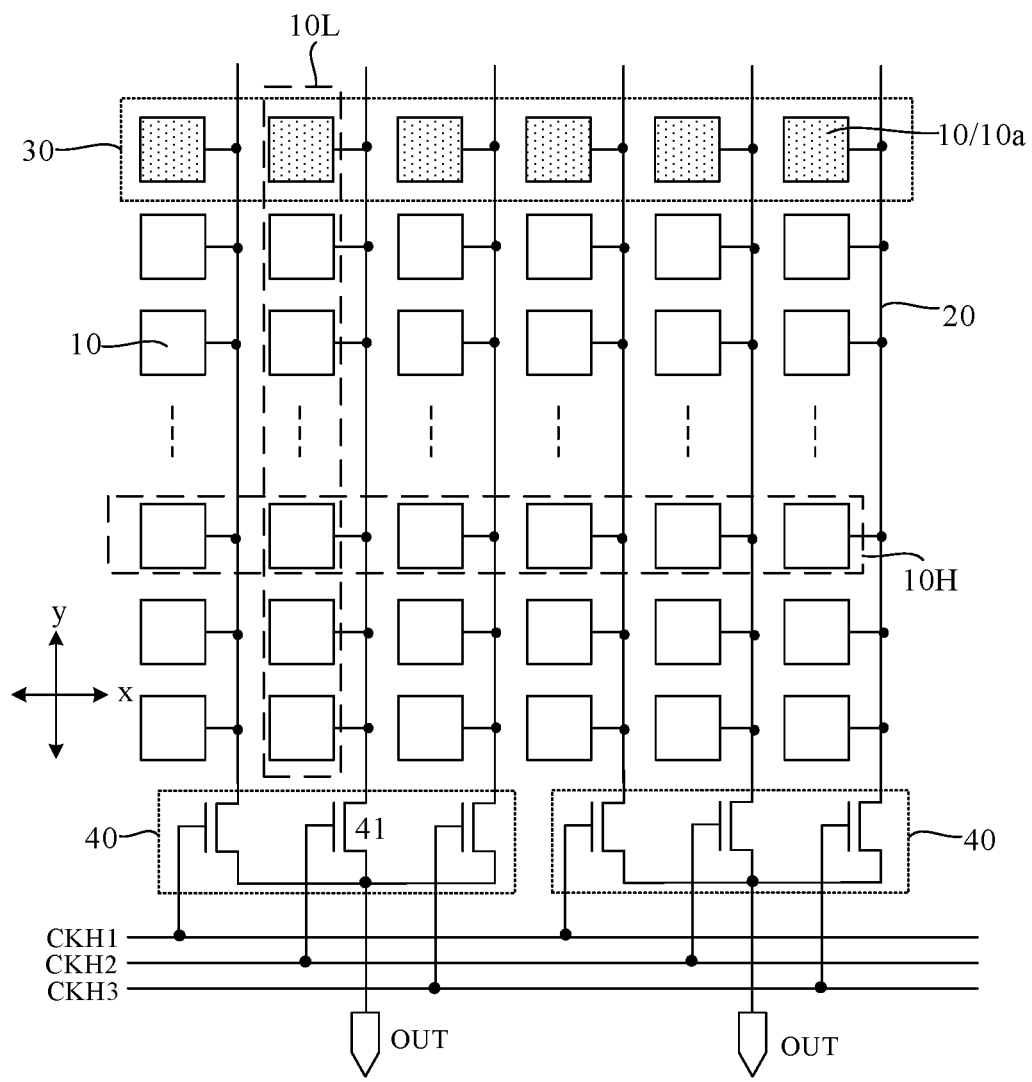
FIG. 6 is a schematic diagram of a portion of another detection circuit according to some embodiments of the present disclosure.

FIG. 6 is a schematic diagram of a portion of another detection circuit according to some embodiments of the present disclosure. In some embodiments, as shown in FIG. 6, the pre-configuration module 30 reuses at least one driving circuit 10, and the driving circuit 10 is used to pre-configure the potential on the signal reading line 20 coupled to the driving circuit 10. In other words, among at least two driving circuits 10 coupled to a same signal reading line 20, at least one driving circuit 10 is configured to pre-configure the signal reading line 20. In this way, a circuit structure of the pre-configuration module 30 is the same as a circuit structure of the driving circuit 10 used for detection in the detection circuit, thus the configuration of the pre-configuration module 30 does not introduce any new process. The driving control of the pre-configuration module 30 can directly refer to the control method of the driving circuit 10, and the function of pre-configuring the signal reading line 20 can be realized by merely adjusting the time-sequence of the control signal of the pre-configuration module 30.

In some embodiments, in the method according to the embodiments of the present disclosure, during the pre-configuration stage, controlling the pre-configuration module 30 to be turned on to output the preset signal to the signal reading line 20 includes controlling at least one driving circuit 10 to be turned on to output the preset signal to the signal reading line 20. According to the method in the embodiments, the signal reading line 20 can be pre-configured with at least one driving circuit 10 during the pre-configuration stage. A circuit structure of the pre-configuration module 30 is the same as a circuit structure of the driving circuit 10 used for detection in the detection circuit, thus the configuration of the pre-configuration module 30 does not introduce any new process. The driving control of the pre-configuration module 30 can directly refer to the control method of the driving circuit 10, and the function of pre-configuring the signal reading line 20 can be realized by merely adjusting the time-sequence of the control signal of the pre-configuration module 30.

In some embodiments, a working cycle of the detection circuit includes a pre-configuration stage and a detection stage. During the pre-configuration stage, at least one driving circuit 10 is turned on to output a preset signal to the signal reading line 20. During the detection stage, at least one driving circuit 10 is turned on to output a detection signal to the read signal line 20. During the detection stage, the working process of the driving circuit 10 that outputs the detection signal can be referred to the relevant description corresponding to the above-mentioned embodiments of FIG. 4. That is, during the pre-configuration stage, one driving circuit 10 is controlled to be turned on, or two or more driving circuits 10 are controlled to be turned on, or all driving circuits 10 are controlled to be turned on, and a voltage signal output from the driving circuit 10 that is turned on during this stage is the preset signal. During the detection stage, at least one driving circuit 10 is controlled to be turned on, or all of the driving circuits 10 are controlled to be turned on, and a voltage signal output from the driving circuit 10 that is turned on during this stage is used as the detection signal for detection. For example, in the applications of fingerprint identification, a voltage signal output from the driving circuit 10 that is turned on during this stage is the detection signal for detection of fingerprint recognition.

For the detection circuit according to the embodiments of the present disclosure, the pre-configuration stage is prior to the detection stage. A preset signal is output to the signal reading line 20 to pre-configure the potential on the signal reading line 20, thus, effect of switching on the detection switch that is coupled to the signal reading line 20, on the potential on the signal reading line 20, can be reduced, thereby reducing the noise introduced to the detection signal and thus improving the detection accuracy. In the embodiments, the pre-configuration module 30 reuses at least one driving circuit 10, thus the configuration of the pre-configuration module 30 does not introduce any new process. The drive control of the pre-configuration module 30 can directly refer to the control method of the driving circuit 10, and the function of pre-configuring the signal reading line 20 can be realized by merely adjusting the time-sequence of the control signal of the pre-configuration module 30.

In some embodiments, multiple driving circuits 10 are arranged in a driving circuit array, and the pre-configuration module 30 reuses at least one driving circuit 10. The at least one driving circuit 10 that is reused as the pre-configuration module 30 is merely configured to perform a pre-configuration function during the pre-configuration stage, and is not used to perform a detection function.

In other embodiments, multiple driving circuits 10 are arranged in a driving circuit array, and at least one driving circuit 10 is reused as the pre-configuration module 30. The at least one driving circuit 10 that is reused as the pre-configuration module 30 is not only used to perform a pre-configuration function in the pre-configuration stage, but also used to perform a detection function.

In some embodiments, as shown in FIG. 6, multiple driving circuits 10 are arranged in a driving circuit array, and the driving circuit array includes multiple driving circuit rows 10H and multiple driving circuit columns 10L. The driving circuit row 10H extends along a first direction x, and the multiple driving circuit rows 10H are arranged along a second direction y. The driving circuit column 10L extends along the second direction y, and the multiple driving circuit columns 10L are arranged along the first direction x. The first direction x intersects with the second direction y. That is, the driving circuit row 10H includes multiple driving circuits 10, and the driving circuit column 10L includes multiple driving circuits 10. The signal reading line 20 extends along the second direction y and is coupled to the multiple driving circuits 10 arranged in one driving circuits column 10L. The driving circuits 10 include a first driving circuit 10a, and the driving circuit row 10H where the first driving circuit 10a is located is reused as the pre-configuration module 30. In this embodiment, it can also be illustrated as that the pre-configuration module 30 includes multiple configuration sub-modules, one of which is configured to pre-configure the potential on one signal reading line 20 and includes at least one first driving circuit 10a.

FIG. 6 illustrates a case where one of the driving circuit rows 10H is reused as the pre-configuration module 30. In other embodiments, two or more of the driving circuit rows 10H are reused as the pre-configuration module 30.

Figure 7:
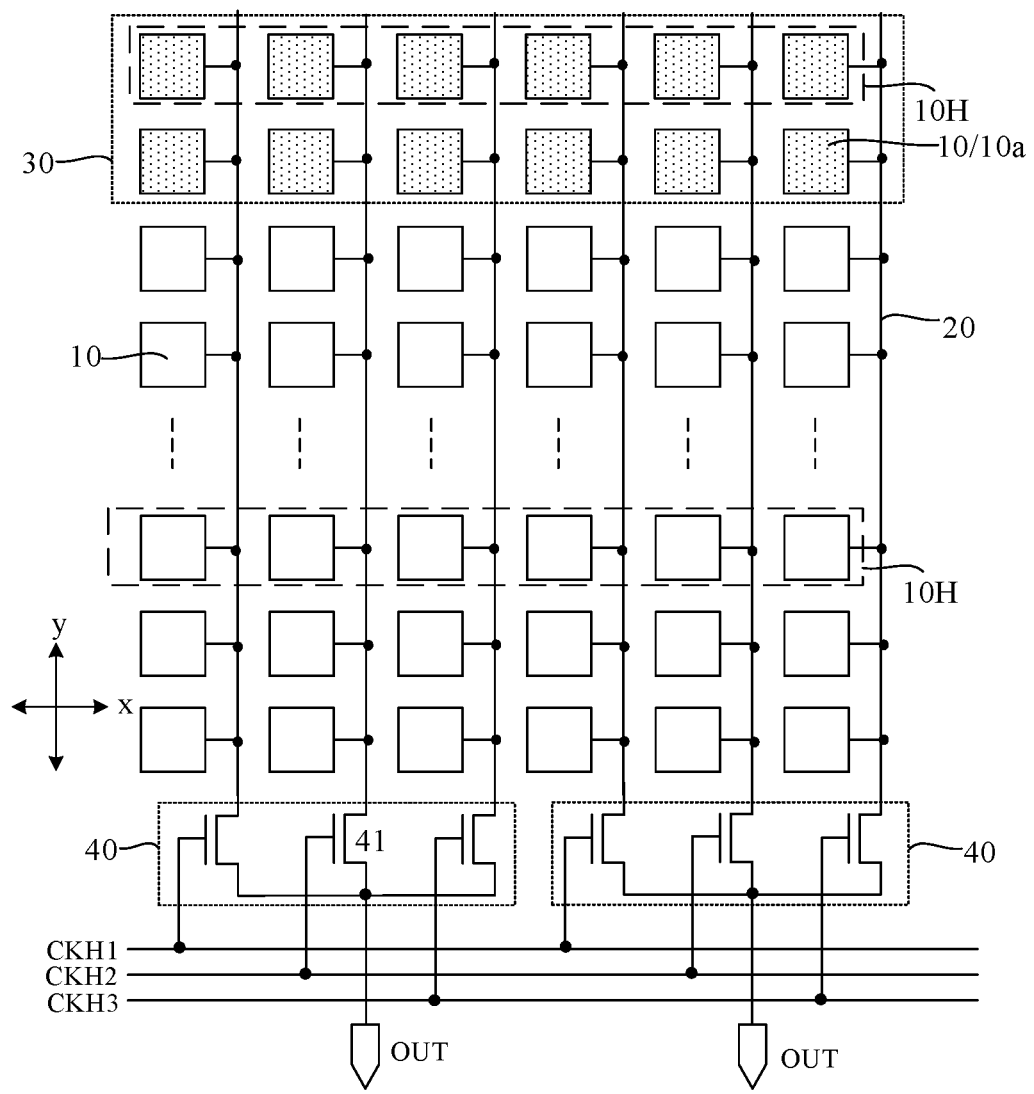
FIG. 7 is a schematic diagram of a portion of another detection circuit according to some embodiments of the present disclosure.

FIG. 7 is a schematic diagram of a portion of another detection circuit according to some embodiments of the present disclosure. In some embodiments, as shown in FIG. 7, two driving circuit rows 10H are reused as the pre-configuration module 30. In this case, for one signal reading line 20, each of two first driving circuits 10a of the two driving circuit rows 10H outputs a preset signal to the signal reading line 20 during the pre-configuration stage. In another embodiment, three driving circuit rows 10H are reused as the pre-configuration module 30. In this case, for one signal reading line 20, each of three first driving circuits 10a of the three driving circuit rows 10H outputs a preset signal to the signal reading line 20 in the pre-configuration stage. By reusing two or more driving circuit rows 10H as the pre-configuration module 30, the number of the first driving circuits 10a that provide preset signals to the signal reading line 20 in the pre-configuration stage can be increased, thereby increasing a speed for pre-configuring the signal reading line 20. Therefore, the time for the signal reading line 20 to reach a stable potential can be reduced, thereby being beneficial to shorten the time of a working cycle of the detection circuit and improve the detection efficiency.

In some embodiments, during the pre-configuration stage, the first driving circuit 10a is turned on to output a preset signal to the signal reading line 20 coupled to the first driving circuit 10a that is turned on. During the detection stage, the first driving circuit 10a is turned on to output a detection signal to the signal reading line 20 coupled to the first driving circuit 10a that is turned on. During the detection stage, in addition to the first driving circuit 10a in the driving circuit array, at least one of the remaining driving circuits 10 in the driving circuit array is also turned on to output a detection signal to the signal reading line 20 accordingly. In the embodiments, the first driving circuit 10a performs the pre-configuration function during the pre-configuration stage, and also performs the detection function during the detection stage.

In another embodiment, during the pre-configuration stage, the first driving circuit 10a is turned on to output a preset signal to the signal reading line 20 coupled to the first driving circuit 10a that is turned on. During the detection stage, in addition to the first driving circuit 10a, each of the remaining driving circuits 10 in the driving circuit array is turned on to output a detection signal to the signal reading line 20. In the embodiments, the first driving circuit 10a merely performs the pre-configuration function during the pre-configuration stage, and at least one of the remaining driving circuits 10 in the driving circuit array perform the detection function during the detection stage.

In some embodiments, a dummy driving circuit is provided at a periphery of an array of the driving circuits 10 used for detection. The driving circuits 10 used for detection refer to the circuits that can perform a detection function in the detection stage. A structure of the dummy driving circuit is the same a structure of the driving circuit 10 used for detection, but the dummy driving circuit is not used for signal detection during the detection stage. When manufacturing the detection circuit, an uneven etching problem caused by sudden change of pattern density in a same layer will occur in the transistor of the dummy driving circuit, and the configuration of the dummy driving circuit can achieve that the characteristics of each transistor in the driving circuit 10 used for detection are uniform. In some embodiments of the present disclosure, the dummy driving circuit originally located in the detection circuit can be reused as the pre-configuration module 30, and the dummy driving circuit is used to pre-configure the signal reading line 20. In this case, there is no need to provide an additional driving circuit used as the pre-configuration module 30, thereby reducing an area occupied by the detection circuit as a whole.

Figure 8:
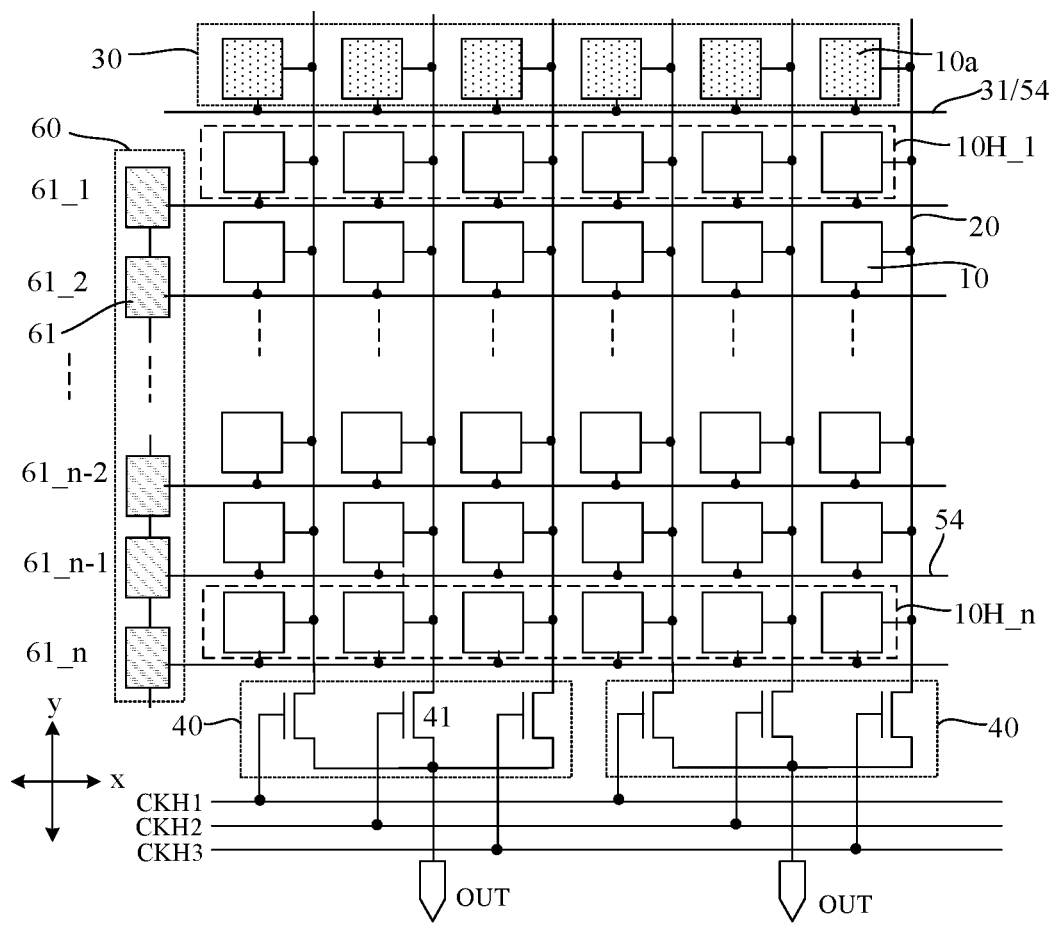
FIG. 8 is a schematic diagram of another detection circuit according to some embodiments of the present disclosure.

FIG. 8 is a schematic diagram of another detection circuit according to some embodiments of the present disclosure. In some embodiments, as shown in FIG. 8, the detection circuit includes a detection shift circuit 60, and the detection shift circuit 60 includes n shift registers 61 that are cascaded, where n is a positive integer, and n≥2. The n shift registers 61 are sequentially a first-stage shift register 61_1, a second-stage shift register 61_2, a third-stage shift register 61_3 . . . , and an $n^{th}$-stage shift register 61_$n$. The n shift registers 61 are respectively coupled to the n driving circuit rows 10H. The detection shift circuit 60 is configured to drive the multiple driving circuit rows 10H row by row in the second direction y. The driving circuit row 10H coupled to the first-stage shift register 61_1 is defined as a first-stage driving circuit row 10H_1, and the driving circuit row 10H coupled to the $n^{th}$-stage shift register 61_$n$ is defined as an $n^{th}$-stage driving circuit row 10H_n. At least one driving circuit row 10H located at a side of the first-stage driving circuit row 10H_1 away from the $n^{th}$-stage driving circuit row 10H_n is reused as the pre-configuration module 30, and the driving circuit row 10H reused as the pre-configuration module 30 includes multiple first driving circuits 10a. In the embodiments, the driving circuit row 10H reused as the pre-configuration module 30 is not coupled to the detection shift circuit 60, thus the driving circuit row 10H reused as the pre-configuration module 30 is merely used to perform a pre-configure function on the potential on the signal reading line 20 in the pre-configuration stage, and not used to perform a detection function in the detection stage. In this way, the control of the pre-configuration module 30 and the control of the driving circuit 10 for detection can be performed independently without interfering with each other, thereby being beneficial to simplify the control method of the detection circuit.

In other embodiments, the detection circuit includes multiple driving circuit rows 10H arranged in the second direction y, at least one driving circuit row 10H is arranged at a side of the first-stage driving circuit row 10H_1 away from the $n^{th}$-stage driving circuit row 10H_n, and at least one driving circuit row 10H is also arranged at a side of the $n^{th}$-stage driving circuit row 10H_n away from the first-stage driving circuit row 10H_1. At least one driving circuit row 10H that is arranged at the side of the first-stage driving circuit row 10H_1 away from the $n^{th}$-stage driving circuit row 10H_n is reused as the pre-configuration module 30, and at least one driving circuit row 10H that is arranged at a side of the $n^{th}$-stage driving circuit row 10H_n away from the first-stage driving circuit row 10H_1 is also reused as the pre-configuration module 30. In the embodiments, two or more driving circuits 10 are used to pre-configure the signal reading line 20 at the same time, so that the potential on the signal reading line 20 can be charged to an expected state relatively quickly in the pre-configuration stage, and the potential on the signal reading line 20 can be stable.

In the embodiments of the present disclosure, the detection circuit includes multiple driving circuit rows 10H arranged in the second direction y, and the first-stage driving circuit row 10H_1 to the $n^{th}$-stage driving circuit row 10H_n sequentially perform a driving function in the detection stage. In other embodiments, at least one driving circuit row 10H located at a side of the $n^{th}$-stage driving circuit row 10H_n away from the first-stage driving circuit row 10H_1 is also reused as the pre-configuration module 30.

As shown in FIG. 8, the detection circuit includes a read scanning line 54 and a pre-scanning control line 31. The driving circuit 10 is coupled to the read scanning line 54. Referring to the schematic diagram shown in FIG. 4, the read scanning line 54 is configured to control a working state of the third transistor T3. During the detection stage, the read scanning line 54 provides an enable signal to control the third transistor T3 to be turned on, such that the signal reading line 20 reads the electric signal. The pre-configuration module 30 is coupled to the pre-scanning control line 31, and the pre-scanning control line 31 is configured to control a working state of the pre-configuration module 30. During the pre-configuration stage, the pre-scanning control line 31 provides an enable signal to control the pre-configuration module 30 to pre-configure the potential on the signal reading line 20. In the embodiments, at least one driving circuit 10 is reused as the pre-configuration module 30, and at least one read scanning line 54 is reused as a pre-scanning control line 31. In other words, a manner in which the pre-scanning control line 31 is coupled to the driving circuit in the pre-configuration module 30 is the same as a manner in which the read scanning line 54 is coupled to the driving circuit 10, except that the read scanning line 54 coupled to the pre-configuration module 30 is not coupled to the shift register 61 in the detection shift circuit 60 in the embodiment shown in FIG. 8.

The embodiment shown in FIG. 8 can also be illustrated as that the pre-configuration module 30 includes multiple configuration sub-modules, one configuration sub-module includes at least one first driving circuit 10a, and one configuration sub-module is coupled to at least one signal reading line 20. Multiple configuration sub-modules are coupled to a same pre-scanning control line 31. By using one pre-scanning control line 31 to control multiple configuration sub-modules, controlling the pre-configuration module 30 can be simplified, and wiring in the detection circuit can be reduced to save space.

In other embodiments, all the driving circuits 10 used for detection are reused as the pre-configuration module 30. In this case, during the pre-configuration stage, all the driving circuits 10 used for detection work to pre-configure the signal reading line 20 coupled thereto, that is, all the driving circuits 10 used for detection during this stage perform the preset function. During the detection stage, all the driving circuits 10 used for detection work to output detection signals to the signal reading line 20, that is, all the driving circuits 10 used for detection perform the detection function in this stage. In the embodiments, the driving circuit 10 used for detection is used to perform the preset function, thus the signal reading line 20 can be pre-configured without providing additional circuit structure, thereby simplifying the structure of the detection circuit and saving space.

Figure 9:
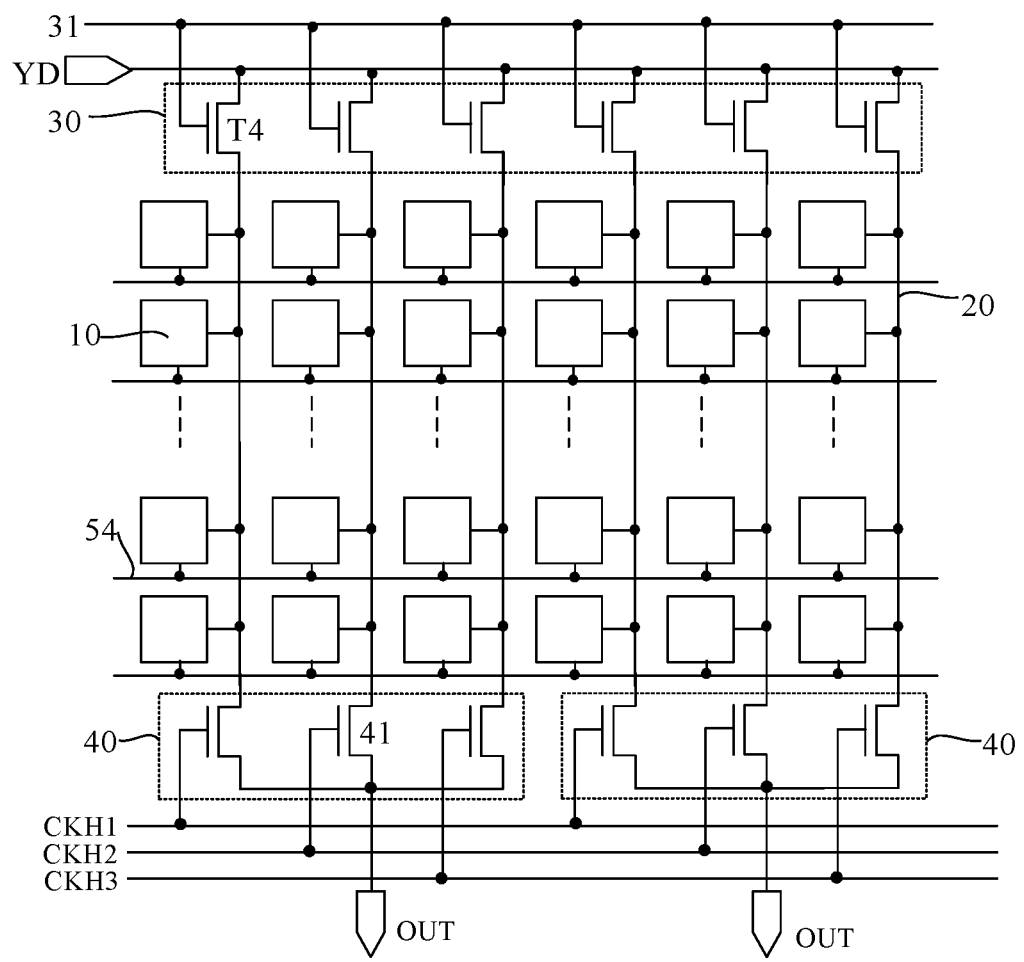
FIG. 9 is a schematic diagram of another detection circuit according to some embodiments of the present disclosure.

FIG. 9 is a schematic diagram of another detection circuit according to some embodiments of the present disclosure. In some embodiments, as shown in FIG. 9, the pre-configuration module 30 includes at least one fourth transistor T4. The fourth transistor T4 includes a first electrode coupled to a preset signal terminal YD configured to provide a preset signal; a second electrode coupled to the signal reading line 20; and a control terminal coupled to the pre-scanning control line 31. As shown in FIG. 9, the signal reading line 20 is provided with a fourth transistor T4. During the pre-configuration stage, the pre-scanning control line 31 provides an enable signal to control the fourth transistor T4 to be turned on, and the preset signal provided by the preset signal terminal YD is written to the signal reading line 20 to pre-configure the potential on the signal reading line 20. In this way, effect of switching on the detection switch 41 that is coupled to the signal reading line 20, on the potential on the signal reading line 20, can be reduced, thereby reducing the noise introduced to the detection signal and thus improving the detection accuracy.

In some embodiments, a value of the preset signal provided by the preset signal terminal YD approaches a voltage value of the signal read by the signal reading line 20 in the detection stage.

In some embodiments, the preset signal has a value of $Y_0$, where $0V \leq Y_0 \leq 5V$. In a working process of the driving circuit 10, a value of the bias voltage provided by the first voltage signal line 52 is $V_1$, then $Y_0 \geq V_1 - V_{th}$, where Vth denotes a threshold voltage of the transistor in the driving circuit 10. In the embodiments of the present disclosure, the value of the preset signal is set by considering the working process of the driving circuit 10 to ensure that the preset signal can pre-charge the signal reading line 20, thereby reducing an effect of witching on the detection switch 41 coupled to the signal reading line 20, on the potential on the signal reading line 20. Besides, the value of the preset signal does not need to be set too large, so as to reduce power consumption.

In the embodiment shown in FIG. 9, one fourth transistor T4 is equivalent to one configuration sub-module. The pre-configuration module 30 includes multiple configuration sub-modules. One configuration sub-module is coupled to at least one signal reading line 20. Multiple configuration sub-modules are coupled to a same pre-scanning control line 31. In other words, multiple fourth transistors T4 are controlled by one pre-scanning control line 31. In this way, method for controlling the pre-configuration module 30 can be simplified, and wiring in the detection circuit can be reduced to save space.

In some embodiments, another method provided by includes: controlling the working cycle of the detection circuit to include a pre-configuration stage and a detection stage.

During the pre-configuration stage, the pre-scanning control line 31 is controlled to provide an enable signal to the pre-configuration module 30 to control the pre-configuration module 30 to be turned on, and a preset signal is output to the signal reading line 20 after the pre-configuration module 30 is turned on.

During the detection stage, the control read scanning line 54 is controlled to provide an enable signal to the driving circuit 10 to control the driving circuit 10 to be turned on, and a detection signal is output to the signal reading line 20 after the driving circuit 10 is turned on.

In the embodiments of the present disclosure, a pulse width of the enable signal provided by the pre-scanning control line 31 is greater than a pulse width of the enable signal provided by the read scanning line 54. In this way, the signal reading line 20 can be fully charged in the pre-configuration stage, so that the potential on the signal reading line 20 after the pre-configuration stage is relatively stable.

Figure 10:
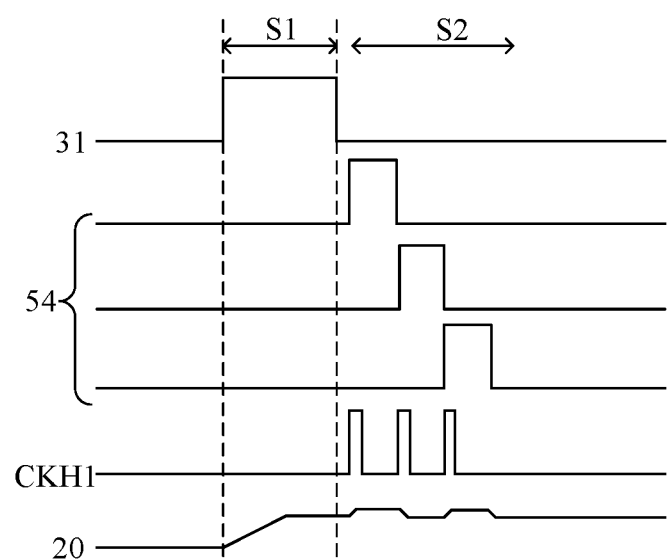
FIG. 10 is a working time-sequence diagram of a detection circuit according to some embodiments of the present disclosure.

FIG. 10 is a working time-sequence diagram of a detection circuit according to some embodiments of the present disclosure. As shown in FIG. 10, the working cycle of the detection circuit includes a pre-configuration stage S1 and a detection stage S2.

During the pre-configuration stage S1, the pre-scanning control line 31 provides an enable signal to control the pre-configuration module 30 to be turned on, and a preset signal is output to the signal reading line 20 to pre-configure the potential on the signal reading line 20 after the pre-configuration module 30 is turned on.

The detection stage S2 is after pre-configuration stage S1. During the detection stage S2, the read scanning line 54 provides an enable signal to control the driving circuit 10 to work, and the driving circuit 10 outputs a detection signal to the signal reading line 20. FIG. 10 illustrates a time-sequence of three read scanning lines 54 arranged in sequence, and the three read scanning lines 54 control three driving circuit rows 10H, respectively. FIG. 10 illustrates a time-sequence of a first branch control line CKH1, and the first branch control line CKH1 controls the detection switches 41 in the multiplexing circuit 40. During a period in which each read scanning line 54 provides the enable signal, the first branch control line CKH1 also provides an enable signal once to control the detection signal read by the signal reading line 20 to be output to a subsequent data processing circuit.

It can be seen from FIG. 10 that a pulse width of the enable signal provided by the pre-scanning control line 31 is greater than a pulse width of the enable signal provided by the read scanning line 54. In this way, the signal reading line 20 can be fully charged in the pre-configuration stage S1, so that the potential on the signal reading line 20 after the pre-configuration stage S1 is relatively stable.

Referring to the embodiment shown in FIG. 8, one driving circuit row 10H is reused as the pre-configuration module 30, and the driving circuit row 10H reused as the pre-configuration module 30 is not coupled to the detection shift circuit 60. In this way, the pre-configuration module 30 and the driving circuit 10 corresponding to detection can be controlled individually, and the pulse width of the enable signal provided by the pre-scanning control line 31 in the pre-configuration stage can be controlled to be greater than the pulse width of the enable signal provided by the read scanning line 54 in the detection stage. The enable signal provided by the pre-scanning control line 31 controls the third transistor T3 in the first driving circuit 10a to be turned on, and the enable signal provided by the read scanning line 54 controls the third transistor T3 in the driving circuit 10 used for detection to be turned on. By increasing the pulse width of the enable signal provided by the pre-scanning control line 31, the on-time of the third transistor T3 in the first driving circuit 10a can be increased to ensure that the signal reading line 20 is fully charged. Therefore, the potential on the reading line 20 after the pre-configuration stage S1 can be stable.

Figure 11:
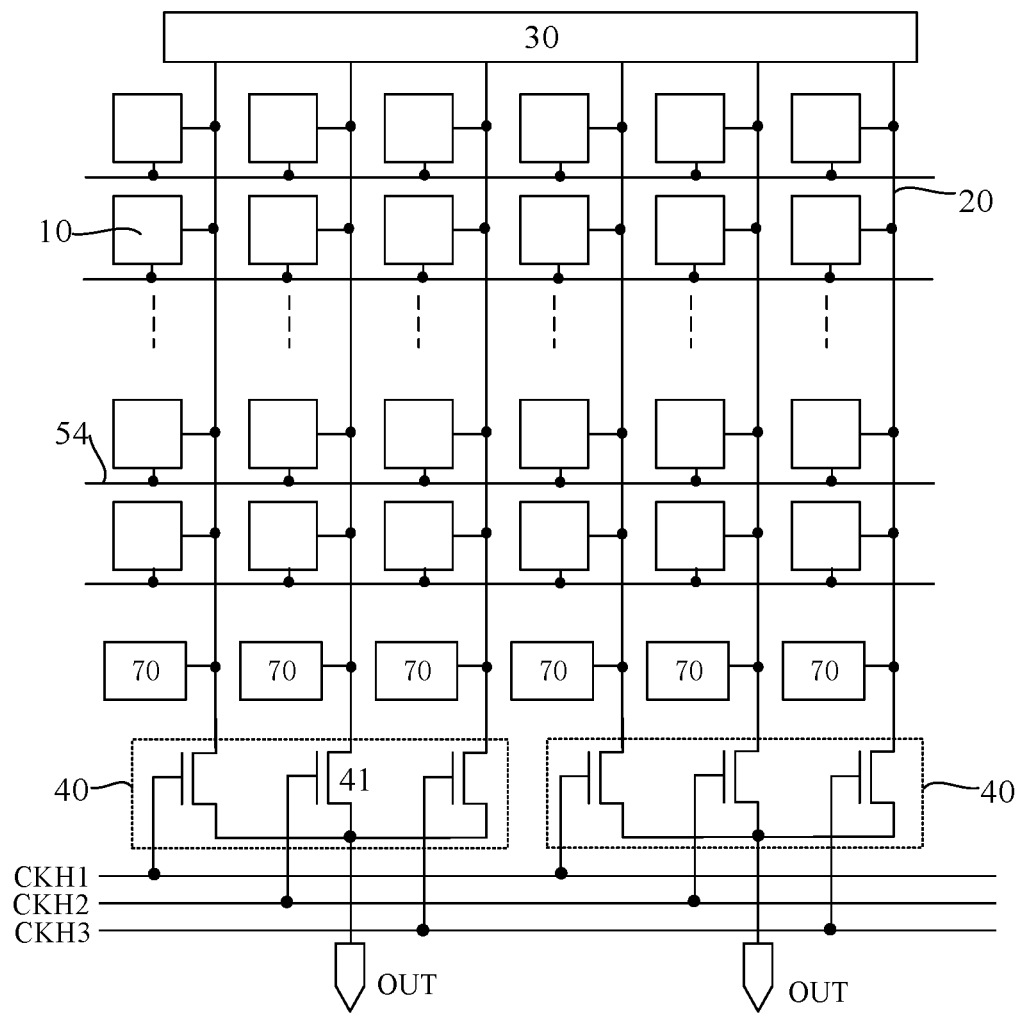
FIG. 11 is a schematic diagram of another detection circuit according to some embodiments of the present disclosure.

FIG. 11 is a schematic diagram of another detection circuit according to some embodiments of the present disclosure. In some embodiments, as shown in FIG. 11, the detection circuit further includes at least one initialization module 70. The initialization module 70 is coupled to the signal reading line 20. The initialization module 70 is configured to initialize the signal reading line 20 before the pre-configuration module 30 is turned on. The working cycle of the detection circuit provided by this embodiment further includes an initialization stage, and the pre-configuration stage is after the initialization stage.

In some embodiments, the method according to the embodiments of the present disclosure further includes: controlling the working cycle of the detection circuit to include an initialization stage. During the initialization stage, the initialization module 70 is controlled to be turned on to reset the signal reading line 20. The detection circuit is controlled to perform the initialization stage before performing the pre-configuration stage.

In a conventional design, when the signal reading line 20 completes a signal reading, or when the signal reading line 20 completes a detection working cycle, the signal reading line 20 will maintain a certain potential, and there is a difference between the potentials on different signal reading lines 20. In the embodiments of the present disclosure, the signal reading line 20 can be reset when the initialization module 70 is turned on, that is, the signal reading line 20 is discharged during the initialization stage, such that the potentials on the signal reading lines 20 are basically the same before the pre-configuration stage. Then, when the signal reading lines 20 are pre-configured in a same time period, a charging speed for each signal reading line 20 is basically the same, and each signal reading line 20 can be charged to basically a same potential. In this way, switching on the detection switch 41 basically has a same influence on the potentials on the signal reading lines 20 during the detection stage, thereby reducing a noise difference between detection signals on different signal reading lines 20, and thus improving detection accuracy.

Figure 12:
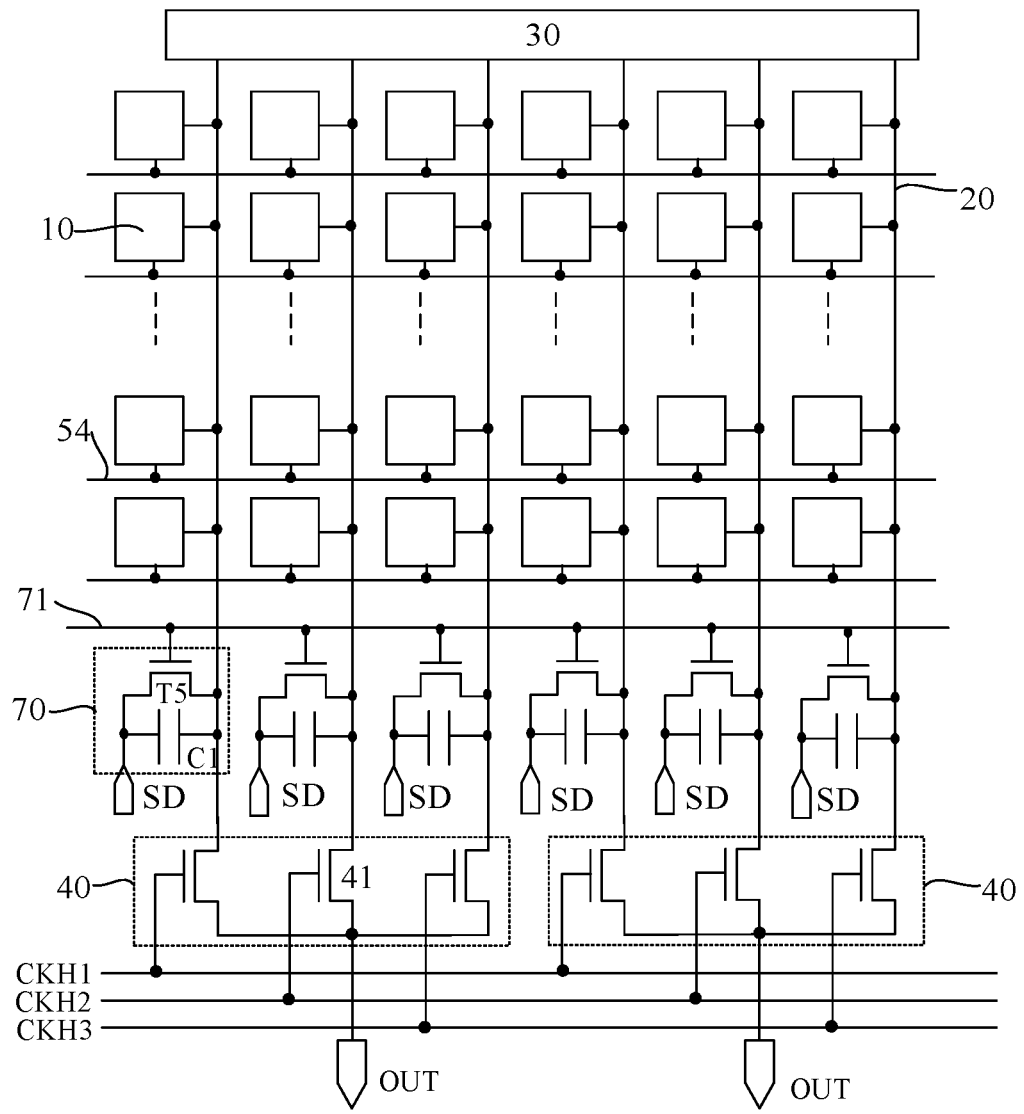
FIG. 12 is a schematic diagram of another detection circuit according to some embodiments of the present disclosure.
Figure 13:
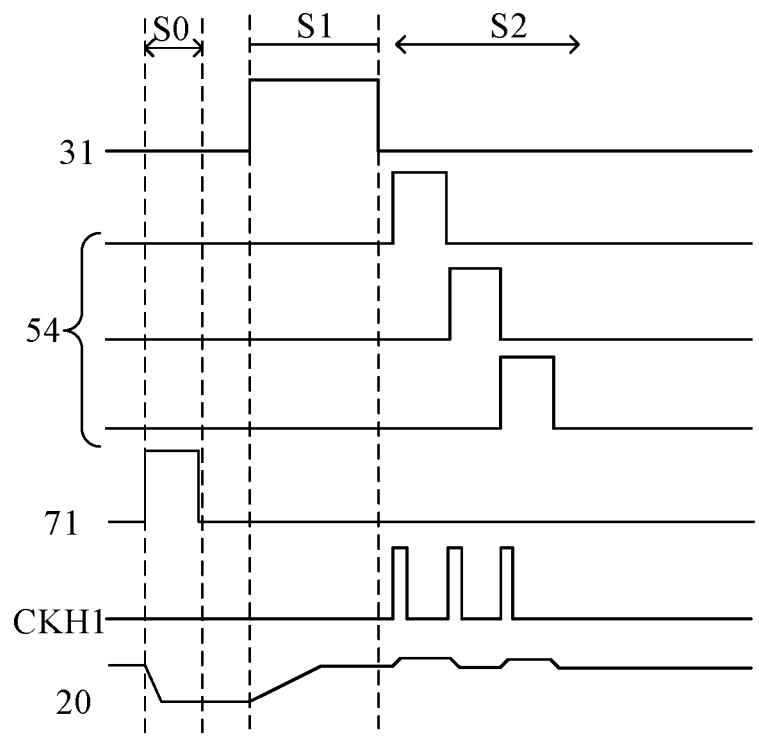
FIG. 13 is a working time-sequence diagram of another detection circuit according to some embodiments of the present disclosure.

FIG. 12 is a schematic diagram of another detection circuit according to some embodiments of the present disclosure. FIG. 13 is a working time-sequence diagram of another detection circuit according to some embodiments of the present disclosure. In some embodiments, as shown in FIG. 12, the initialization module 70 includes a fifth transistor T5. The fifth transistor T5 includes a first electrode coupled to an initialization voltage terminal SD, which is configured to provide an initialization signal; a second electrode coupled to the signal reading line 20; and a control terminal coupled to an initialization control line 71.

As shown in FIG. 13, the working cycle of the detection circuit further includes an initialization stage S0, and the pre-configuration stage 51 is after the initialization stage S0. During the initialization stage S0, the initialization control line 71 provides an enable signal to control the fifth transistor T5 to be turned on, and the initialization voltage terminal SD writes an initialization signal to the signal reading line 20 to reset the potential on the signal reading line 20. In this way, the potentials on the signal reading lines 20 are basically the same before the pre-configuration stage. Then, when each signal reading line 20 is pre-configured during a same period, a charging speed for the signal reading lines 20 are basically the same, and the signal reading lines 20 can be charged to a basically same potential. In this way, switching on the detection switch 41 basically has a same influence on the potentials on the signal reading lines 20 during the detection stage, thereby reducing a noise difference between detection signals on different signal reading lines 20, and thus improving detection accuracy.

As shown in FIG. 12, the initialization module 70 includes a first capacitor C1. The first capacitor C1 includes a first electrode plate coupled to the signal reading line 20, and a second electrode plate coupled to the initialization voltage terminal SD. In the embodiments, the configuration of the first capacitor C1 can stabilize the potential on the signal reading line 20 coupled to the first capacitor C1, so that the potential on the signal reading line 20 can be stable after the initialization stage.

As shown in FIG. 12, the control terminals of multiple initialization modules 70 are coupled to a same initialization control line 71. During the initialization stage, one initialization control line 71 is used to control multiple initialization modules 70, thereby reducing wiring in the detection circuit and saving space.

Figure 14:
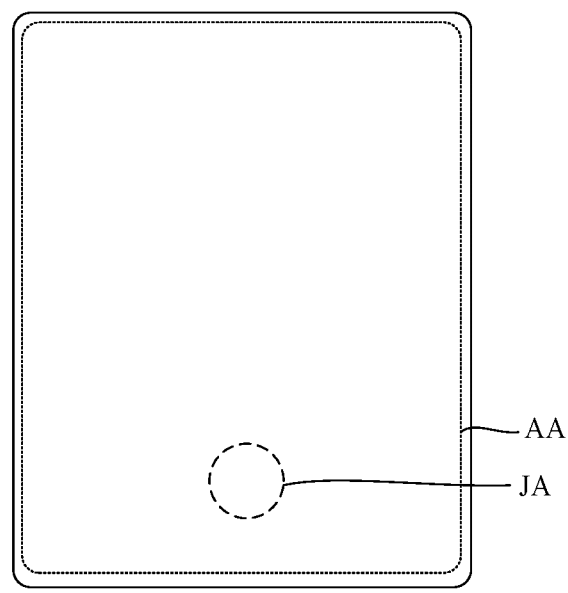
FIG. 14 is a schematic diagram of a display device according to some embodiments of the present disclosure.

Some embodiments of the present disclosure provide a display device which includes the detection circuit according to any embodiment of the present disclosure. FIG. 14 is a schematic diagram of a display device according to some embodiments of the present disclosure. As shown in FIG. 14, the display device has a display area AA, and the display area AA includes a detection area JA. A position of the detection area JA in the display area AA is merely schematic. The embodiments of the present disclosure do not limit a shape, a size, or the like of the detection area JA. The detection circuit is not shown in FIG. 14. In the embodiments of the present disclosure, the detection circuit is arranged in a module structure of the display device, and the detection circuit overlaps with the detection area JA. In some embodiments, the detection area JA is a fingerprint identification area, and the detection circuit is configured to realize a fingerprint identification function of the display device.

The display device provided by the embodiments of the present disclosure is, for example, any device with a display function, such as a mobile phone, a tablet computer, a notebook computer, an electronic paper book, a TV, or a smart watch.

The above-described embodiments are merely some embodiments of the present disclosure and are not intended to limit the present disclosure. Any modifications, equivalent substitutions, and improvements made within the principle of the present disclosure shall fall into the protection scope of the present disclosure.

Finally, it should be noted that, the above-described embodiments are merely for illustrating the present disclosure but not intended to provide any limitation. Although the present disclosure has been described in detail with reference to the above-described embodiments, it should be understood by those skilled in the art that, it is still possible to modify the technical solutions described in the above embodiments or to equivalently replace some or all of the technical features therein, but these modifications or replacements do not cause the essence of corresponding technical solutions to depart from the scope of the present disclosure.

What is claimed is:

1. A detection circuit, comprising:
    driving circuits;
    signal reading lines, one of which is coupled to at least two of the driving circuits,
    a pre-configuration module, wherein the pre-configuration module is coupled to the signal reading lines, and configured to output a preset signal to the signal reading lines to pre-configure potentials on the signal reading lines, and
    pre-scanning control lines, wherein the pre-configuration module comprises configuration sub-modules, wherein one of the configuration sub-modules is coupled to at least one of the signal reading lines, and multiple ones of the configuration sub-modules are coupled to one of the pre-scanning control lines.

2. The detection circuit according to claim 1, wherein one driving circuit of the driving circuits comprises a reset sampling module, a driving module, a controlling module, and a detection unit,
    wherein the reset sampling module is coupled to the detection unit, and configured to reset the detection unit and receive and store an electric signal fed back by the detection unit,
    wherein the driving module is coupled to the reset sampling module, and configured to read and amplify an electric signal stored by the reset sampling module, and
    wherein the controlling module is coupled to both the driving module and one signal reading line of the signal reading lines that is coupled to the one driving circuit, and the controlling module is configured to provide the electric signal amplified by the driving module to the one signal reading line.

3. The detection circuit according to claim 2, wherein the reset sampling module comprises a first transistor and a storage capacitor, and the driving module comprises a second transistor, and the controlling module comprises a third transistor,
    wherein the first transistor comprises a control terminal coupled to a first control signal line, a first electrode coupled to a first voltage signal line, and a second electrode coupled to the detection unit;
    wherein the storage capacitor comprises a first electrode plate coupled to the detection unit, and a second electrode plate coupled to a second voltage signal line,
    wherein the second transistor comprises a control terminal coupled to the first electrode plate of the storage capacitor, a first electrode coupled to the second electrode plate of the storage capacitor, and a second electrode coupled to a first electrode of the third transistor, and
    wherein the third transistor comprises a control terminal coupled to one of read scanning lines, and a second electrode coupled to the one signal reading line.

4. The detection circuit according to claim 2, further comprising a driving electrode, a piezoelectric material layer, and a receiving electrode that are stacked together, wherein the piezoelectric material layer is located between the driving electrode and the receiving electrode, and the receiving electrode is coupled to the reset sampling module.

5. The detection circuit according to claim 1, wherein the pre-configuration module reuses at least one of the driving circuits.

6. The detection circuit according to claim 5, wherein a working cycle of the detection circuit comprises a pre-configuration stage and a detection stage,
    wherein during the pre-configuration stage, at least one of the driving circuits is turned on to output the preset signal to one of the signal reading lines, and
    wherein during the detection stage, at least one of the driving circuits is turned on to output a detection signal to one of the signal reading lines.

7. The detection circuit according to claim 5, wherein the driving circuits are arranged in a driving circuit array, wherein the driving circuit array comprises driving circuit rows and driving circuit columns,
    wherein each of the driving circuit rows extends along a first direction, the driving circuit rows are arranged along a second direction, each of the driving circuit columns extends along the second direction, the driving circuit columns are arranged along the first direction, and the first direction intersects with the second direction, and
    wherein one of the signal reading lines extends along the second direction and is coupled to one of the driving circuit columns, and
    wherein the pre-configuration module reuses at least one of the driving circuit rows.

8. The detection circuit according to claim 6, further comprising:
    a detection shift circuit, wherein the detection shift circuit comprises n shift registers that are cascaded and are coupled to n driving circuit rows of the driving circuit rows, where n is a positive integer and n≥2,
    wherein one driving circuit row of the n driving circuit rows that is coupled to the first-stage shift register is defined as a first-stage driving circuit row, and one driving circuit row of the n driving circuit rows that is coupled to an $n^{th}$-stage shift register is defined as an $n^{th}$-stage driving circuit row, and
    wherein the pre-configuration module reuses at least one driving circuit row of the driving circuit rows that is located at a side of the first-stage driving circuit row away from the $n^{th}$-stage driving circuit row, and/or reuses at least one driving circuit row of the driving circuit rows that is located at a side of the $n^{th}$-stage driving circuit row away from the first-stage driving circuit row.

9. The detection circuit according to claim 5, further comprising read scanning lines, wherein one of the driving circuits is coupled to one of the read scanning lines, and the pre-configuration module is coupled to at least one of the pre-scanning control lines, and
wherein at least one of the read scanning lines is reused as the pre-scanning control line.

10. The detection circuit according to claim 1, wherein the pre-configuration module comprises at least one fourth transistor, wherein one of the at least one fourth transistor comprises a first electrode coupled to a preset signal terminal, and a second electrode coupled to one of the signal reading lines; and the preset signal terminal is configured to provide the preset signal.

11. A detection circuit, comprising:
driving circuits;
signal reading lines, one of which is coupled to at least two of the driving circuits,
a pre-configuration module, wherein the pre-configuration module is coupled to the signal reading lines, and configured to output a preset signal to the signal reading lines to pre-configure potentials on the signal reading lines, and
a pre-scanning control line coupled to the pre-configuration module, and read scanning lines, wherein one of the read scanning lines is coupled to at least two of the driving circuits, and
wherein a pulse width of an enable signal provided by the pre-scanning control line is greater than a pulse width of an enable signal provided by one of the read scanning lines.

12. A detection circuit, comprising:
driving circuits;
signal reading lines, one of which is coupled to at least two of the driving circuits,
a pre-configuration module, wherein the pre-configuration module is coupled to the signal reading lines, and configured to output a preset signal to the signal reading lines to pre-configure potentials on the signal reading lines, and
at least one initialization module coupled to the signal reading lines and configured to initialize the signal reading lines before the pre-configuration module is turned on.

13. The detection circuit according to claim 12, wherein one initialization module of the at least one initialization module comprises a fifth transistor comprising a first electrode coupled to an initialization voltage terminal and a second electrode coupled to one of the signal reading lines.

14. The detection circuit according to claim 13, wherein the one initialization module comprises a first capacitor, wherein the first capacitor comprises a first electrode plate coupled to one of the signal reading lines, and a second electrode plate coupled to an initialization voltage terminal.

15. The detection circuit according to claim 12, further comprising at least one initialization control line, wherein the at least one initialization module comprises a plurality of initialization modules, and control terminals of at least two initialization modules of the plurality of initialization modules are coupled to one of the at least one initialization control line.

16. The detection circuit according to claim 1, further comprising at least one multiplexing circuit, wherein at least two of the signal reading lines are connected to one of the at least one multiplexing circuit.

17. The detection circuit according to claim 1, wherein the preset signal has a value of $Y_0$, where $0 \text{ V} \leq Y_0 \leq 5 \text{ V}$.

18. A method for driving the detection circuit according to claim 1, wherein the method comprises:
controlling a working cycle of the detection circuit to comprise a pre-configuration stage and a detection stage, wherein the pre-configuration module is controlled to be turned on to output a preset signal to the signal reading lines during the pre-configuration stage, and at least one of the driving circuits is controlled to be turned on to output a detection signal to the signal reading lines during the detection stage.

19. The method according to claim 18, wherein the pre-configuration module reuses at least one driving circuit of the driving circuits, and
wherein said controlling the pre-configuration module to be turned on to output the preset signal to the signal reading lines comprises: controlling the at least one driving circuit to be turned on to output the preset signal to the signal reading lines.

20. The method according to claim 18, wherein the detection circuit further comprises a pre-scanning control line coupled to the pre-configuration module, and read scanning lines, wherein one of the read scanning lines is coupled to at least two of the driving circuits,
wherein said controlling the pre-configuration module to be turned on to output the preset signal to the signal reading lines comprises: controlling the pre-scanning control line to provide an enable signal to the pre-configuration module to control the pre-configuration module to be turned on;
wherein controlling the at least one of the driving circuits to be turned on to output the detection signal to the signal reading lines comprises: controlling at least one read scanning line of the read scanning lines to provide an enable signal to the at least one of the driving circuits to control the at least one of the driving circuits to be turned on, and
wherein a pulse width of the enable signal provided by the pre-scanning control line is greater than a pulse width of the enable signal provided by the at least one read scanning line.

21. The method according to claim 18, wherein the detection circuit further comprises an initialization module coupled to the signal reading lines, and
wherein the method further comprises: controlling the working cycle of the detection circuit to comprise an initialization stage, wherein the initialization module is controlled to be turned on to reset the signal reading lines during the initialization stage, and the detection circuit is controlled to perform the initialization stage before performing the pre-configuration stage.

22. A display device, comprising the detection circuit according to claim 1.

* * * * *